(12) United States Patent
Spattini (10) Patent No.: US 12,192,021 B2
(45) Date of Patent: *Jan. 7, 2025

(54) SYSTEM FOR WIRELESS PRESENTATION AND COMPUTER PROGRAMS THEREFOR

(71) Applicant: HUDDLE ROOM TECHNOLOGY S.R.L., Campogallioano (IT)

(72) Inventor: Stefano Spattini, Campogalliano (IT)

(73) Assignee: HUDDLE ROOM TECHNOLOGY S.R.L., Campogallioano (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,910

(22) Filed: Oct. 16, 2023

(65) Prior Publication Data

US 2024/0048399 A1    Feb. 8, 2024

Related U.S. Application Data

(63) Continuation of application No. 17/423,870, filed as application No. PCT/IB2020/050333 on Jan. 16, 2020, now Pat. No. 11,855,794.

(30) Foreign Application Priority Data

Jan. 18, 2019    (IT) .................. 102019000000829

(51) Int. Cl.
*H04L 12/18* (2006.01)
*H04L 51/043* (2022.01)
(Continued)

(52) U.S. Cl.
CPC ...... *H04L 12/1822* (2013.01); *H04L 12/1827* (2013.01); *H04L 51/043* (2013.01); *H04L 51/046* (2013.01); *H04N 7/15* (2013.01)

(58) Field of Classification Search
None
See application file for complete search history.

(56) References Cited

U.S. PATENT DOCUMENTS

2011/0271129 A1    11/2011  Flannagan et al.
2013/0268592 A1    10/2013  Yerli
(Continued)

FOREIGN PATENT DOCUMENTS

WO    2010118145 A2    10/2010

OTHER PUBLICATIONS

International Search Report issued in the corresponding International Application No. PCT/IB2020/050333, mailed on Mar. 17, 2021.

*Primary Examiner* — Angela Nguyen (57) ABSTRACT

A system for wireless presentation is provided, including a server, and a plurality of user terminals connected to the server, wherein each user terminal includes a user display and at least one first processing apparatus associated to a display unit and configured to establish a connection to the server. The server can be adapted to preconfigure a plurality of virtual rooms, each virtual room being selectable by at least one user terminal. The server can further be configured to simultaneously manage a plurality of temporary sessions, each temporary session corresponding to one of the plurality of virtual rooms. The system can be configured, when a first user terminal selects a virtual room, to create a temporary session corresponding to the selected virtual room and to allow said first user terminal to access the temporary session. Each temporary session can be accessible by at least another user terminal. The at least one first processing apparatus can be associated to a predetermined virtual room and can be configured to access a temporary session corresponding to the predetermined virtual room. In each temporary session, at least one user terminal which has accessed the temporary (Continued)

session is a presenter user terminal which is configured to transmit an image signal to all the other user terminals which have accessed the same temporary session and to the first processing apparatus which has accessed the same temporary session. All the user terminals other than the presenter user terminal which have accessed the same temporary session as the presenter user terminal can be configured to display, via the respective user displays, first image content on the basis of the image signal. Furthermore, the at least one first processing apparatus can be configured to cause the display unit to display second image content on the basis of the image signal.

20 Claims, 6 Drawing Sheets

(51) Int. Cl.
*H04L 51/046* (2022.01)
*H04N 7/15* (2006.01)

(56) References Cited

U.S. PATENT DOCUMENTS

| 2018/0184047 | A1 | 6/2018 | Simonsen et al. |
| 2020/0177838 | A1 | 6/2020 | Yoshida |

SYSTEM FOR WIRELESS PRESENTATION AND COMPUTER PROGRAMS THEREFOR

TECHNICAL FIELD OF THE INVENTION

The present disclosure relates to a system, a collection of computer programs and a collection of computer-readable data carriers for giving wireless presentations.

PRIOR ART

So-called "endpoint" or "room" or "group" apparatus dedicated to videoconferences with multiple participants present simultaneously in conference rooms and the like are known.

The known apparatus are generally provided with a camera, one or more screens, microphones and loudspeakers and are installed by trained operators inside the rooms they must serve. However, such known apparatus are in general very costly and scarcely flexible, since they are not easily or rapidly adaptable to the different needs of users. Furthermore, these apparatus cannot be effectively employed when different users are located in different rooms.

Alternatively to this type of apparatus, the use of "desktop" type systems is known, said systems being made up of a PC, a monitor, loudspeakers, a webcam, a microphone and video conferencing software. This type of apparatus is very economical and rather effective if a user wishes to take part in a video conference, for example, from his or her desk, but it does not effectively meet the needs of a video conference in a room with a number of participants.

There are also known systems that use the cameras of mobile terminals (e.g. smartphones, tablets and portable computers) of users such as peripherals for video image capture; in this type of systems, the videos captured by the mobile terminals are sent to a hub apparatus that sends the captured images to a remote terminal participating in the video conference.

Such video conferencing systems can also be used for sharing visual information, such as, for example, presentations of diagrams or graphs, presentations of slides and the like. The sharing or presentation, of visual information, can be an integral part of a video conference or else be completely separate, i.e. it can take place in the absence of a video conference.

In the prior art, however, there exists a problem of how to make such sharing of visual information possible among a plurality of mobile terminals that are not necessarily situated in a same location and one, or more, remote locations in an easy, flexible and economical manner.

Another problem present in the prior art is that of integrating, in a simple, easy and fast manner, terminals or objects that are not specifically conceived for use in an information presentation system (for example a normal television set or cameras external to the system) and a plurality of mobile terminals.

SUMMARY OF THE INVENTION

One aim of the present invention is to improve the prior art by providing a system, software components and hardware components for wireless presentation.

The object of the invention is achieved both by means of the hardware system described and by means of the respective software components that can be stored in suitable data carriers.

According to one embodiment in particular, there is provided a system for wireless presentation including a server and a plurality of user terminals connected to the server, wherein each user terminal includes a user display and at least one first processing apparatus associated to a display unit and configured to establish a connection to the server.

The server can be adapted to preconfigure a plurality of virtual rooms, each virtual room being selectable by at least one user terminal, and preferably by more than one user terminal. The server can be further configured to simultaneously manage a plurality of temporary sessions, each temporary session corresponding to one of the plurality of virtual rooms.

The system can be configured, when a first user terminal selects a virtual room, to create a temporary session corresponding to the selected virtual room and to enable said first user terminal to access the temporary session. Each temporary session can be accessible by at least another user terminal, and preferably by more than one other user terminal. The at least one first processing apparatus can be associated to a predetermined virtual room and can be configured to access a temporary session corresponding to the predetermined virtual room.

In each temporary session, at least one user terminal which has accessed the temporary session is a presenter user terminal configured to transmit an image signal to all the other user terminals which have accessed the same temporary session and to the first processing apparatus which has accessed the same temporary session. All the user terminals other than the presenter user terminal which have accessed the same temporary session as the presenter user terminal can be configured to display, via the respective user displays, first image content on the basis of the image signal. Furthermore, the at least one first processing apparatus can be configured to cause the display unit to display second image content on the basis of the image signal.

In accordance with the above-described embodiment, it is possible to enable the sharing of information among a plurality of users in a simple, efficient manner, while simplifying, moreover, the construction and management of the system. In particular, by virtue of the fact that the server is capable of simultaneously managing a plurality of virtual rooms and the associated temporary sessions, it is possible to enable different content to be shared among different groups of users who access the various virtual rooms, wherein at least one group of users is enabled to share content with the at least one first processing apparatus associated, for example, with a television set. Furthermore, thanks to the first processing apparatus, which takes care of configuring the display unit (for example a television set) and connecting it to the system for wireless presentation, it is possible to benefit from the sharing of content not only via one's own user device, but also, for example, in a physical conference room equipped with the display unit; furthermore, thanks to the first processing apparatus associated to the display unit, the display unit need not necessarily be provided with dedicated hardware and/or software in order to be connected to the system for wireless presentation; therefore, even a television set that is not provided with a network connection means can be used to share visual content via the system for wireless presentation.

According to a further embodiment, the number of preconfigured virtual rooms is larger than the number of the at least one processing apparatus. In this manner it is possible, by means of a single system and a same architecture, to simultaneously manage a number of wireless presentations in a centralised manner, where the number of wireless presentations is not limited to the number of display units (for example, the number of television sets in different conference rooms) physically available in a system. Therefore, assuming for example that a system includes a number X of display units in X physical rooms, the number of wireless presentations which are supported simultaneously will be larger than the number X of available physical rooms equipped with respective display unit.

According to a further embodiment, a plurality of processing apparatus in the system is present. Each processing apparatus can be connectable to a respective display unit, and each of the plurality of processing apparatus can be associated to a virtual room of the plurality of virtual rooms and be preconfigured to access a temporary session corresponding to the respective associated virtual room. Furthermore, each first processing apparatus can be associated to a different virtual room compared to the other processing apparatus. In this way it is possible, by means of a single system and a same architecture, to simultaneously manage a number of wireless presentations in a centralised manner, thus also enabling the use of a number of display units and, therefore, a number of endpoint systems (such as, for example, a number of physical rooms equipped with a television set). In particular, by virtue of the fact that the server is capable of simultaneously managing a plurality of virtual rooms and associated temporary sessions, it is possible to enable the sharing of different content among different groups of users and different first processing apparatus which access the various virtual rooms.

According to yet a further embodiment, the first processing apparatus can be associated to a predetermined virtual room and be configured to automatically access a temporary session corresponding to the predetermined virtual room, when the temporary session corresponding to the predetermined virtual room is created. In this way it is possible to render efficient the creation and use of different sessions by the users of the system.

According to yet a further embodiment, at least one user terminal of the plurality of user terminals can be configured to access the created temporary session on the basis of session information. (i) The session information can be input information, inputted by a user of the user terminal. (ii) Alternatively, the user of the user terminal can trigger the user terminal to automatically detect the session information. (iii) Again alternatively, the user terminal is configured to automatically detect the session information. (iv) Finally, again alternatively, the session information is generated as a consequence of the first user terminal accessing the virtual room, and the first user terminal and/or server is adapted to distribute the session information to at least another user terminal of the plurality of user terminals. In accordance with this embodiment, it is possible to control access to the temporary session and, therefore, it is possible to increase flexibility and enhance the user experience.

According to a further embodiment, in each temporary session, at least two user terminals which have accessed the same temporary session can be presenter user terminals, each of which is configured to transmit a respective image signal. The at least one first processing apparatus can be configured to cause the respective display unit to display the second image content on the basis of a patchwork of the image signals from the at least two presenter user terminals. According to this embodiment it is possible to combine presentations from different user terminals, thus increasing the versatility of the system.

According to a further embodiment, the image signal transmitted by the presenter user terminal is indicative of content displayable by the user display of the presenter user terminal. In this way, the user of the presenter user terminal is capable of optimally managing the wireless presentation.

According to a further embodiment, the presenter user terminal is configured to prevent other user terminals which have accessed the same temporary session from transmitting image signals. Thanks to this embodiment it is possible to assign partial administrator rights to the presenter user terminal, making it possible to adapt the system to different usage requirements and thus enhancing the user experience.

According to a further embodiment, the system can further include at least one second processing apparatus connectable to a camera. The second processing apparatus can be configured to receive from a camera an input camera signal and can be configured to transmit an output camera signal on the basis of the input camera signal. The at least one second processing apparatus can be associated to the same virtual room as the at least one first processing apparatus and can be configured to access the temporary session corresponding to the virtual room. The user terminals which have accessed the same temporary session as the second processing apparatus can be configured to receive the output camera signal from the second processing apparatus. Thanks to this embodiment it is possible send the camera signal captured by the camera to all the user terminals participating in a temporary session associated to the second processing apparatus, thus enhancing the experience of the user, who is now able to receive visual feedback from the users picked up by the camera. For example, if the camera is in the same remote location as the first processing apparatus, the visual feedback could be provided by users who watch the presentation via the display unit 4.

According to a further embodiment, (i) at least one user terminal of the plurality of user terminals can be configured to establish a wireless connection with the server. (ii) Alternatively, at least one processing apparatus of the plurality of processing apparatus can be configured to establish a wireless connection with the server. (iii) Again alternatively, at least one user terminal of the plurality of user terminals and at least one processing apparatus of the plurality of processing apparatus are configured to establish a wireless connection with the server. The possibility that some elements of the system (for example the first processing apparatus or the second processing apparatus) can be connected to the server wirelessly considerably simplifies the use and installation of the system, in particular allowing the use of mobile user terminals (such as, for example, smartphones, laptops, tablets) and endpoints lacking a network cable connection.

According to yet a further embodiment, there is provided a collection of computer programs for wireless presentation comprising (i) a plurality of user terminal software modules installable on respective user terminals, wherein each user terminal includes a user display, (ii) a server software module installable on a server, (iii) at least one software module for a first processing apparatus associable to a display unit installable on a first processing apparatus associable to a display unit and which can be configured to establish a connection to the server software module. The server software module can be adapted to preconfigure a plurality of virtual rooms in the server, each virtual room being selectable by at least one user terminal software module; the server software module is configured to enable the server to simultaneously manage a plurality of temporary sessions, each temporary session corresponding to one of the plurality of virtual rooms. The collection of computer programs can be configured, when a first user terminal software module selects a virtual room, to create a temporary session corresponding to the selected virtual room and to enable said first user terminal software module to access the temporary session, each temporary session being accessible by each user terminal software module. The at least one software module for the first processing apparatus can be associated to a predetermined virtual room and be configured to access a temporary session corresponding to the predetermined virtual room. In each temporary session, at least one user terminal software module which has accessed the temporary session can be configured to enable the respective user terminal to function as a presenter user terminal by configuring it to transmit an image signal to all the other user terminal software modules which have accessed the temporary session and to the software module for the first processing apparatus which has accessed the temporary session. Furthermore, all the user terminal software modules other than the user terminal software module associated with the presenter user terminal which have accessed the same temporary session as the presenter user terminal can be configured to enable the respective user terminals to display, via the respective user displays, first image content on the basis of the image signal. The at least one software module for the first processing apparatus can be configured to cause the display unit to display second image content on the basis of the image signal.

According to yet a further embodiment, there is provided a collection of computer-readable data carriers wherein the computer programs of the previous embodiment are stored.

The above-described embodiments are capable of producing the same benefits produced by the system. In fact, as will be further apparent to the person skilled in the art, the present invention, even though mainly described in terms of a system for wireless presentation, is similarly implementable at a software level, either through the use of software modules which are installable or installed in the respective terminals, or with the aid of respective computer-readable data carriers, wherein the various software components have been stored.

BRIEF DESCRIPTION OF THE DRAWINGS

The features and advantages of the present invention will be illustrated with reference to an example embodiment of the invention described with reference to the appended drawings. In the drawings.

DETAILED DESCRIPTION

Figure 1:
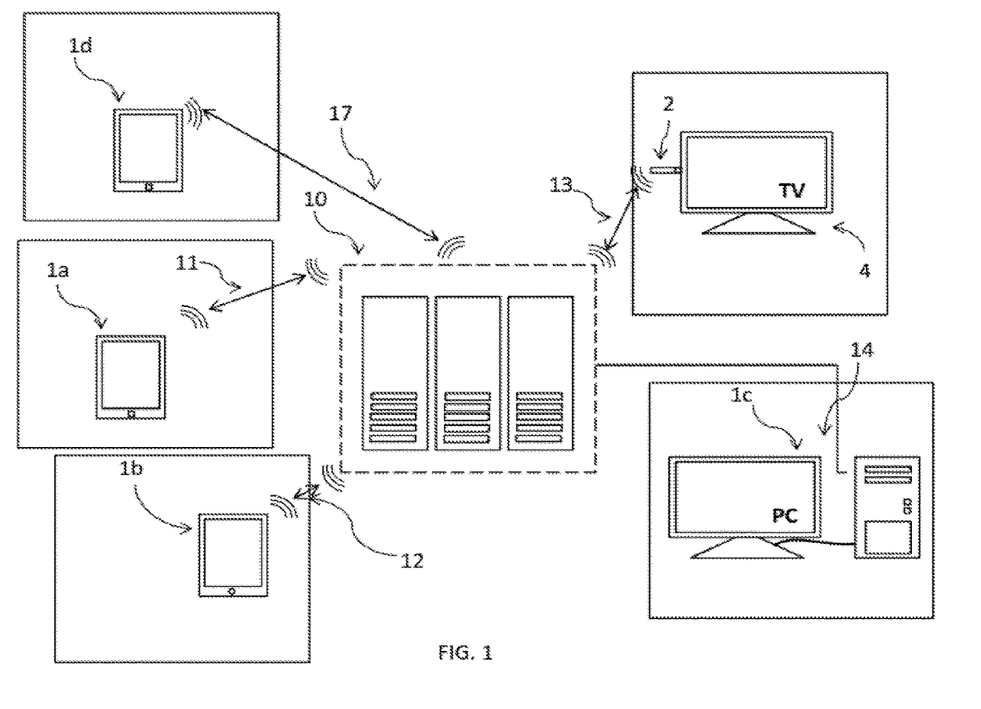
FIG. 1 schematically illustrates the system for wireless presentation according to one embodiment of the invention.

FIG. 1 shows a system for wireless presentation which comprises a plurality of (two or more) user terminals, 1a-1d, a server 10 and a first processing apparatus 2 associable to a display unit 4. For example, the devices 1a-1d, 10, 2 and 4 could all be connected to a local network, in particular a company network.

A user terminal is generically a device equipped with a display screen (hereinafter defined as "user display") enabling the display of visual information or images. The user terminal can preferably be configured to allow data to be inputted by a user of the terminal (for example via a keyboard or another user interface) and can be endowed with a computing capacity. Preferably, but not necessarily, at least one of the terminals of the plurality of terminals is endowed with the data inputting function and includes a respective input field.

Examples of such user terminals include mobile phones, smartphones, portable computers, desktop computers, smartwatches and tablets. The list is not exhaustive and other devices can naturally be used as user devices provided that they can allow the viewing of visual information and/or transmission of image signals. According to some embodiments, a part of the user terminals could be purely passive terminals, i.e. ones which enable data to be received and images to be displayed, but are not capable of receiving data inputted by users and/or of enabling the transmission of image signals.

The display unit 4 can be, for example, a television set or a simple screen or monitor. Generically, any device suitable for reproducing visual information can act as a display unit 4, provided that it is associable (for example connectable) to the first processing apparatus 2. The association can be made, for example, with a connection via a USB (Universal Serial Bus) port, or else via an HDMI (High-Definition Multimedia Interface) port. Other types of associations such as wireless associations are likewise possible.

The display unit 4 and the first processing apparatus 2 can be situated in a physical room (or conference room) or in a room adapted to accommodate endpoint systems and the like, and adapted to accommodate a plurality of people.

The first processing apparatus could be implemented by means of a so-called "dongle". The dongle could be endowed with a network—for example Wi-Fi network—connection function in order to connect to the server and a physical port for connecting to the display unit, for example an HDMI or USB port. The dongle further comprises a processor for processing input signals and emitting respective signals obtained through the processing to the display unit and/or server. In accordance with an alternative embodiment, the first processing apparatus could be implemented through a processor integrated in a display unit 4, for example in the event that the display unit 4 is implemented through a so-called smart TV equipped with a computer and a network interface. In such a case, through an appropriate installation of a software module in the smart TV, both the first processing apparatus 2 and the display unit 4 can be implemented through said device.

The user terminals and processing apparatus are connectable to the server via the connections 11-17. In some embodiments, said connections 11-17 can be wireless connections, at least for some of the user terminals 1a-1d and/or the first processing apparatus 2. However, other types of connections 11-17, for example physical cable connections (for example via LAN, WAN), are likewise possible for some user terminals and/or for the first processing apparatus. The above-mentioned devices are preferably connected via a local network.

Furthermore, in some implementations all of the user terminals 1a-1d and the first processing apparatus 2 of the system could be physically connected by cables to the server 10. However, according to other implementations, all of the user terminals 1a-1d and the first processing apparatus 2 of the system could be connected wirelessly to the server 10. The second processing apparatus 3 (shown in FIG. 3), of which greater details will be provided below, can likewise be connected to the server 10 via the connection 15, according to the same methods as for the first processing apparatus 2.

The server 10 is adapted to preconfigure a plurality of virtual rooms, Room_1-Room_n, and to manage a plurality of temporary sessions, Session_1A-Session_nC.

Figure 2:
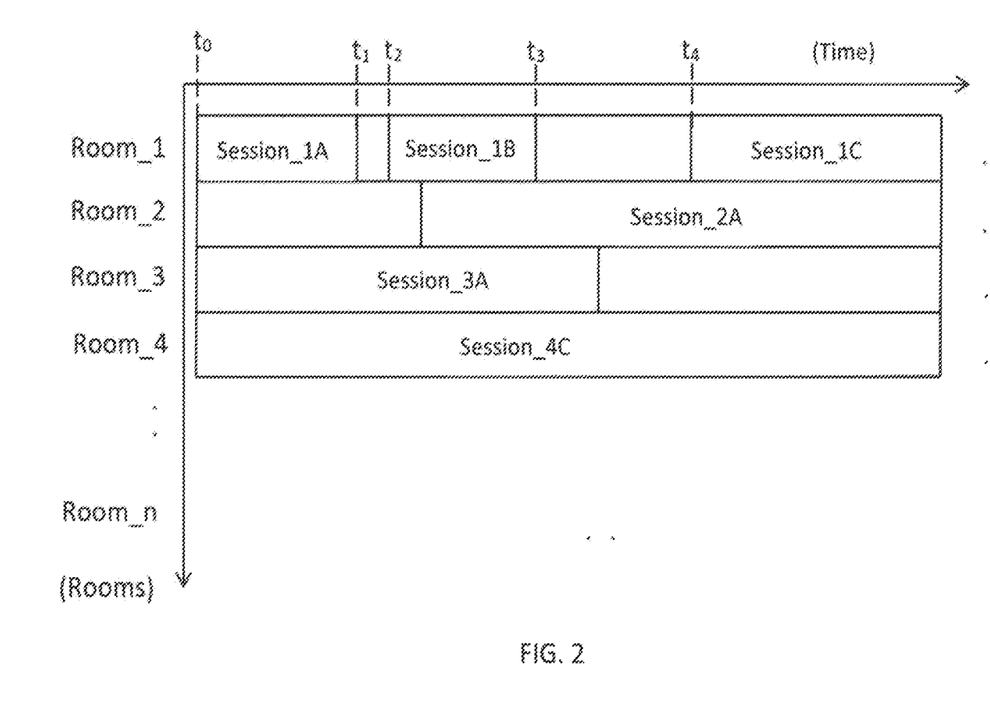
FIG. 2 schematically illustrates the logical relationship between rooms and sessions.

The concepts of virtual room and temporary session will now be illustrated by way of example with reference to FIG. 2.

A virtual room can be defined by analogy with a physical room, which allows various users to communicate by providing them with a suitable physical environment for interacting with one another.

A virtual room is therefore such as to enable communication among different entities of the system, for example between the user terminals 1a-1d and the first processing apparatus 2 (and/or the second processing apparatus 3), by providing them with a suitable virtual environment for interacting with one another.

The server 10 is such as to be able to allow said communication and will be equipped with all the appropriate software and logic structures necessary for the enabling thereof. Said communication can be achieved in a variety of ways, as is readily known to the person skilled in the art.

Each virtual room can be preconfigured by the server, meaning that the server can associate each virtual room with the necessary identification data, for example network IDs, so as to enable their identification by the user devices 1a-1d, the first processing apparatus 2 and the second processing apparatus 3 connected to the server.

Furthermore, via an appropriate reconfiguration of the server 10, it is possible to create, or else remove, virtual rooms and enable their selection by each user terminal 1a-1d and/or processing apparatus (first processing apparatus 2 or second processing apparatus 3) connected to the server 10. In any case, during normal operation of the system, the virtual rooms are preconfigured in a static manner at the server 10 and can be modified only by means of a special maintenance operation and/or update performed by a system administrator. It is further possible, by appropriately reconfiguring the server, to limit the possibility of a subgroup of user terminals accessing a certain virtual room. In other words, it is possible render a certain virtual room inaccessible to one or more user terminals of the system.

When one of the user terminals 1a-1d (the first user terminal) selects a given virtual room, the system is configured to create a temporary session associated with the virtual room.

The temporary session logically corresponds to the virtual room for a given period of time.

The system is further configured to enable a user terminal to access the temporary session after the selection of the virtual room and therefore after the creation of the temporary session. The function of allowing a user terminal access to a temporary session can be advantageously performed by the server 10 and/or the first user terminal which launched the creation of the session through the selection of a virtual room. According to one embodiment, in every temporary session, each user terminal of the plurality of user terminals 1a-1d can access a temporary session after the creation thereof following the selection of a virtual room by the first user terminal. According to one embodiment, a same user terminal can gain access a first time, exit the temporary session and re-enter the temporary session later.

According to a variation of this embodiment, after having been selected, and therefore after the creation of the temporary session, the virtual room can no longer be selectable by and/or available to the other user terminals 1a-1d. This makes it possible to avoid interferences between temporary sessions by preventing the possibility of starting a session in an already selected room.

Furthermore, a given user terminal of the plurality 1a-1d can gain access to the temporary session only if it is in possession of session information.

Unlike a virtual room, a temporary session has a limited duration in time. A virtual room is in fact available to the user terminals for an indefinite period of time, whereas a temporary session corresponds to a session of visual content sharing and can last, for example, for a few minutes up to several hours.

At least one of the user terminals 1a-1d, also defined hereinafter as the "administrator user terminal", can have administrator rights over the temporary session, i.e. it can define the characteristics or properties of the temporary session. Such characteristics may include, but are not limited to, duration of the temporary session, number of participants, list of participants and the like.

The administrator user terminal may, but need not necessarily, correspond to the first user terminal (i.e. the terminal that caused the creation of the temporary session by selecting a given virtual room) and/or to the presenter user terminal. The presenter user terminal will be introduced below.

The duration of a temporary session can be pre-established, or it can be configured by the administrator user terminal, for example in the process of selecting a virtual room, or after having accessed the temporary session.

The server 10 is further configured to simultaneously manage a number of temporary sessions, Session_1A-Session_nC, each temporary session corresponding to one of the plurality of virtual rooms, Room_1 to Room_n.

As shown by FIG. 2, a temporary session corresponds to a single virtual room. However, a single session corresponds to a virtual room only for a given time instant. In other words, a same virtual room can have corresponding to it a number of successive temporary sessions that do not overlap in time.

At the end of each temporary session, a certain virtual room can be again selected by a user terminal and the system can generate a new temporary session corresponding to that selection.

For example, a given virtual room, Room_1, can be selected by a given user terminal and, consequently, a first temporary session, session_1A, can be created by the system at the time instant $t_0$. Said temporary session can end, or be terminated, at the time instant $t_1$. When another user terminal selects the given virtual room, Room_1, a second session, Session_1B, can be created at the time instant $t_2$ and extend in time until the time instant $t_3$. Similarly, a third session, Session_1C, can be created at the time instant $t_4$.

Going back to FIG. 1, the first processing apparatus 2 can be statically associated to a predetermined virtual room and can be configured to access a temporary session corresponding to the predetermined virtual room. In other words, each time a mobile terminal selects the virtual room associated to the processing apparatus 2, the first processing apparatus 2 will be capable of accessing the temporary session created by the system automatically. This access may take place simultaneously with the access of the first user terminal to the temporary session, or after a given time delay which may be set, for example, by the administrator user terminal.

According to a preferred embodiment, the processing apparatus 2 associated to a predetermined virtual room can be configured to automatically access a temporary session corresponding to the predetermined virtual room, when (for example, as soon as) the temporary session corresponding to the predetermined virtual room is created.

"Static association" here means an association definable a priori by a system administrator via the server 10 or via one of the processing apparatus. The system administrator can newly define static associations so as to adapt the system to the various usage requirements. New static associations may be defined, for example, when a new processing apparatus is added to the system or when a processing apparatus, already statically associated to a given virtual room, is associated to a different display or placed in a different remote location (for example a different conference room).

Furthermore, in each temporary session, at least one user terminal that has accessed the temporary session can be a presenter user terminal, which can be configured to transmit an image signal to all the other user terminals that have accessed the same session.

The presenter user terminal can be further configured to transmit the image signal to the first processing apparatus 2 which has accessed the same session by virtue of the static association. The image signal can be indicative of visual images, such as, for example, Powerpoint® presentations, photo presentations and the like.

The image signal can naturally also be associated to an audio signal according to some embodiments and depending on the particular implementation needs. Associations with other types of signals are likewise possible.

The user terminals other than the presenter user terminal which have accessed the same session as the presenter user terminal can be configured to display, via the respective user displays, first image content on the basis of the image signal.

The first processing apparatus 2 which has accessed the temporary session is configured to cause the display unit 4 to display second image content on the basis of the image signal.

The first image content displayed by the user terminals 1*a*-1*d* and the second image content displayed by the display unit 4 can be substantially identical in content, but could also differ, for example, in formatting or in the image resolution. Furthermore, either the first image content and the second image content can be a subset of the other. For example, the first image content can represent a given presentation, whilst the second image content can represent a portion of that presentation or vice versa.

The system can generically be capable of configuring any number whatsoever of virtual rooms greater than two. According to yet another particular implementation, the system can preconfigure a number greater than 10 virtual rooms, preferably a number greater than 50 virtual rooms. In a particular embodiment, 64 virtual rooms can be preconfigured.

In general, according to a preferred embodiment, the number of preconfigured virtual rooms can be greater than the number of the at least one processing apparatus 2.

According to one embodiment, the server 10 can be capable of managing a number of temporary sessions simultaneously and therefore the system can be capable of enabling the sharing of different content among different groups of users that access the different virtual rooms.

For example, with reference to FIG. 1 and FIG. 2, the user terminals 1*a* and 1*c* can have accessed a given session, for example Session_3A, corresponding to the virtual Room_3, whilst other user terminals, for example user terminals 1*b* and 1*d*, can have accessed another given session, for example Session_1B, corresponding to the virtual room Room_1. Furthermore, the first processing apparatus 2 could also have accessed the temporary session Session_1B. Accordingly, the user terminals 1*b* and 1*c* and the first processing apparatus 2 are enabled to share content with each other and the user terminals 1*a* and 1*d* can simultaneously be enabled to share other content with each other.

In FIG. 1, the system is represented as comprising a single processing apparatus 2. However, the present invention is not limited to this and can include any number of first processing apparatus 2.

According to this embodiment, the system can include a plurality of first processing apparatus 2, and each processing apparatus 2 of the plurality is connectable to a respective display unit 4. According to this embodiment, therefore, a plurality of display units 4 can be present. Moreover, each processing apparatus of the plurality of processing apparatus is associated to a virtual room of the plurality of virtual rooms, Room_1-Room n, and can be preconfigured to access a temporary session corresponding to the respective associated virtual room.

Preferably, each first processing apparatus 2 can be associated to a different virtual room compared to the other processing apparatus.

Figure 4:
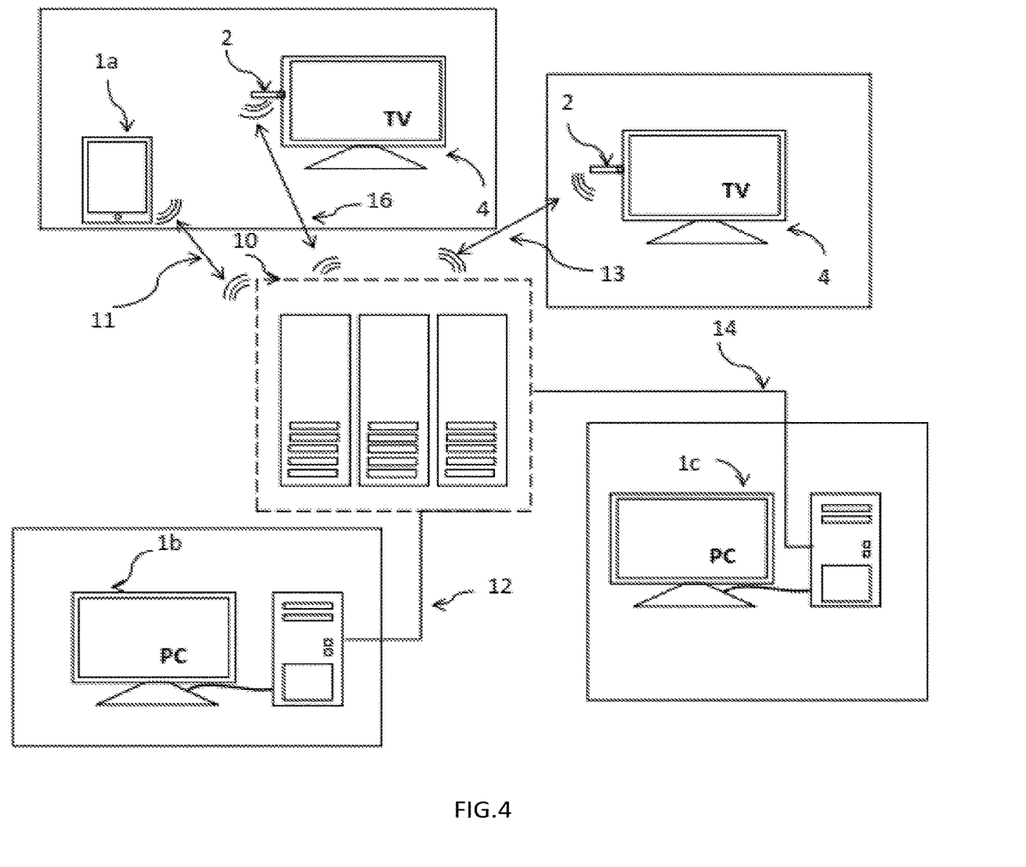
FIG. 4 schematically illustrates the system for wireless presentation according to yet a further embodiment of the invention.

For example, FIG. 4 shows, by way of example, a case in which two first processing apparatus 2 and two display units 4 are present. Furthermore, some user terminals of the plurality of the user terminals can be in the same environment (same remote location, for example a same room) as a first processing apparatus 2 and a display unit 4, as shown, by way of example, in the figure in the case of the user terminal 1*a*.

According to some embodiments, at least one user terminal of the plurality of user terminals 1*a*-1*d*, can be configured to access the temporary session on the basis of session information.

The session information is information enabling access to a given session and the validity thereof can thus be limited in time, like the session itself. According to some particular implementations, the session information can be input information, inputted by a user of the user terminal. For example, the user could input, in a specific input field of the user terminal, a PIN (Personal Identification Number) or a keyword. The user could likewise draw a symbol in the input field. The user of the user terminal could alternatively cause the user terminal to automatically detect the session information. For example, the user could set the user terminal to detect a barcode, a QR (Quick Response) code, or an RFID (Radio Frequency Identification) identifier.

Again alternatively, the user terminal could be configured to automatically detect the session information, for example by constantly monitoring for the presence of session information (for example by means of RFID technology) within a range of detection of session information of the user terminal. The monitoring could be performed at regular time intervals, or according to a time sequence that is pre-established, or else it can be determined by the user of the user device. For example, the session information could be disseminated within a conference room via a short-range transmitter, so that only the user terminals located inside the conference room are able to receive the session information and thus access the session itself.

Finally, according to yet another alternative, the session information could be generated as a consequence of the first user terminal accessing the virtual room. In this case, the first user terminal could be adapted to distribute the session information to at least another user terminal of the plurality of user terminals 1a-1d. The distribution function can likewise be performed by the server 10 instead of by the first user terminal. Furthermore, both the server and the first user terminal can distribute the session information.

According to this embodiment, the user terminals other than the first user terminal could receive the session information via a link sent through dedicated software. In order to increase the security of the system, the user of the user terminal could receive the session information through channels external to the system for wireless presentation and the system could cause the transmission of the session information (or transmit it directly) through the external channel so as to enable the user terminal to access the session. Examples of external channels could be e-mail notification or SMS notification.

In accordance with yet another preferred embodiment, for a given session, more than one presenter user terminal could be present, for example four presenter user terminals or "n" presenter user terminals could be present, "n" being any whole number greater than or equal to two. In particular, at least two user terminals which have accessed the same temporary session can be presenter user terminals. In this case, each of the presenter user terminals could be configured to transmit a respective image signal and the first processing apparatus 2 could be configured to cause the respective display unit 4 to display the second image content on the basis of a patchwork of the image signals from at least two presenter user terminals. The patchwork could consist of two image contents, corresponding respectively to two image signals. The image contents could be arranged in various ways, for example placed next to each other, or one on top of the other, partially overlapping, arranged along a diagonal of the display unit 4 and like configurations.

The image signal transmitted by the at least one presenter user terminal could be indicative of content displayable by the user display of the presenter user terminal. In other words, the presenter user terminal could enable the other user terminals and the first processing apparatus 2 to perform, at least partially a "screen mirroring", i.e. to reproduce at least one portion of the content shown by the presenter user terminal.

Again according to another preferred embodiment, the presenter user terminal could be configured to prevent other user terminals which have accessed the same session from transmitting image signals.

Figure 3:
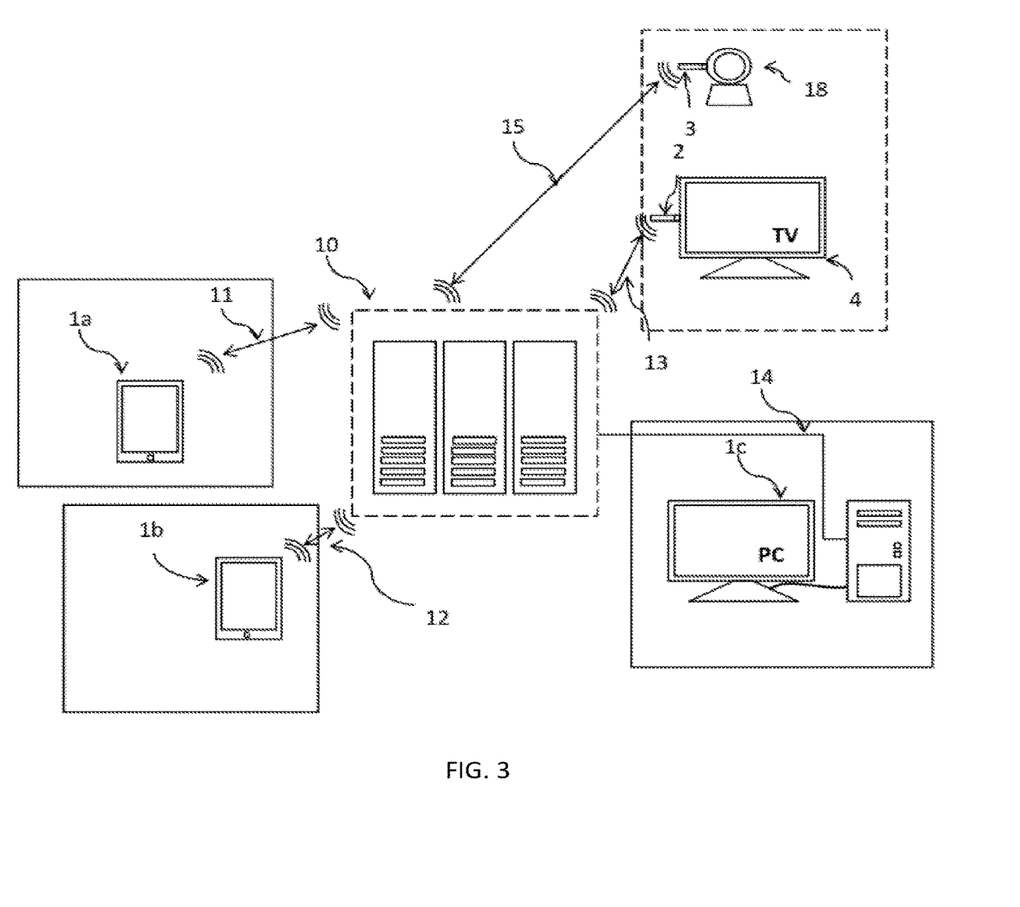
FIG. 3 schematically illustrates the system for wireless presentation according to a further embodiment of the invention.

As shown by FIG. 3, the system for wireless presentation can further include at least one second processing apparatus 3 connectable to a camera 18. The second processing apparatus 3 can be configured to receive from the camera 18 an input camera signal and to transmit to the server 10 an output camera signal generated on the basis of the input camera signal.

The second processing apparatus 3 can be associated to the same virtual room as the first processing apparatus 2 and can be configured to access the temporary session corresponding to the virtual room.

Moreover, the second processing apparatus 3 can be implemented by means of a "dongle" in a similar manner to the first processing apparatus 2.

In this case, the user terminals which have accessed the same temporary session as the second processing apparatus 3 can be configured to receive the output camera signal from the second processing apparatus 3.

Furthermore, the first processing apparatus 2 which has accessed the same temporary session as the second processing apparatus 3 can be configured to receive the output camera signal of the camera 18 from the second processing apparatus 3.

According to this embodiment, the user terminals can display, via the respective user displays, the first image content also on the basis of the output camera signal. In other words, the user terminals can display a patchwork created both on the basis of the image signal and on the basis of the output camera signal.

More generally, the system can include a plurality of second processing apparatus 3, each placed in a respective remote location and connectable to a respective camera 18.

This embodiment can be easily combined with other previously described embodiments, for example it can be easily used in the presence of a number of presenter user terminals or in the presence of a number of first processing apparatus 2.

Furthermore, the first processing apparatus 2 can also generate a patchwork signal on the basis of a plurality of image signals received from a plurality of presenter user terminals, and can cause the display unit 4 to display the patchwork on the basis of the patchwork signal. For example, if there are m presenter user terminals, m being a whole number greater than one, the patchwork could consist of m image contents, corresponding respectively to m image signals.

As already described previously, said m image contents could be arranged in various ways, for example placed next to each other, or one on top of the other, partially overlapping, arranged along a diagonal of the display unit 4 and like configurations. Alternatively, the image content could be mixed according to different logics according to implementation needs.

The first processing apparatus 2 and the second processing apparatus 3 can be placed in a same location, for example in a same conference room.

Advantageously, the second processing apparatus 3, irrespective of its physical location, can provide visual feedback to the users of the respective user terminals 1a-1c, for example to the user of the presenter user terminal.

According to a further preferred embodiment, at least one user terminal of the plurality of user terminals, 1a-1d, can be configured to establish a wireless connection, 11, 12 or 14, with the server 10. Alternatively, at least one processing apparatus of the plurality of processing apparatus can be configured to establish a wireless connection, 13, with the server 10. Again alternatively, at least one user terminal of the plurality of user terminals, 1a-1d, and at least one processing apparatus, 2 or 3, of the plurality of processing apparatus are configured to establish a wireless connection, 11-17, with the server 10.

Figure 5:
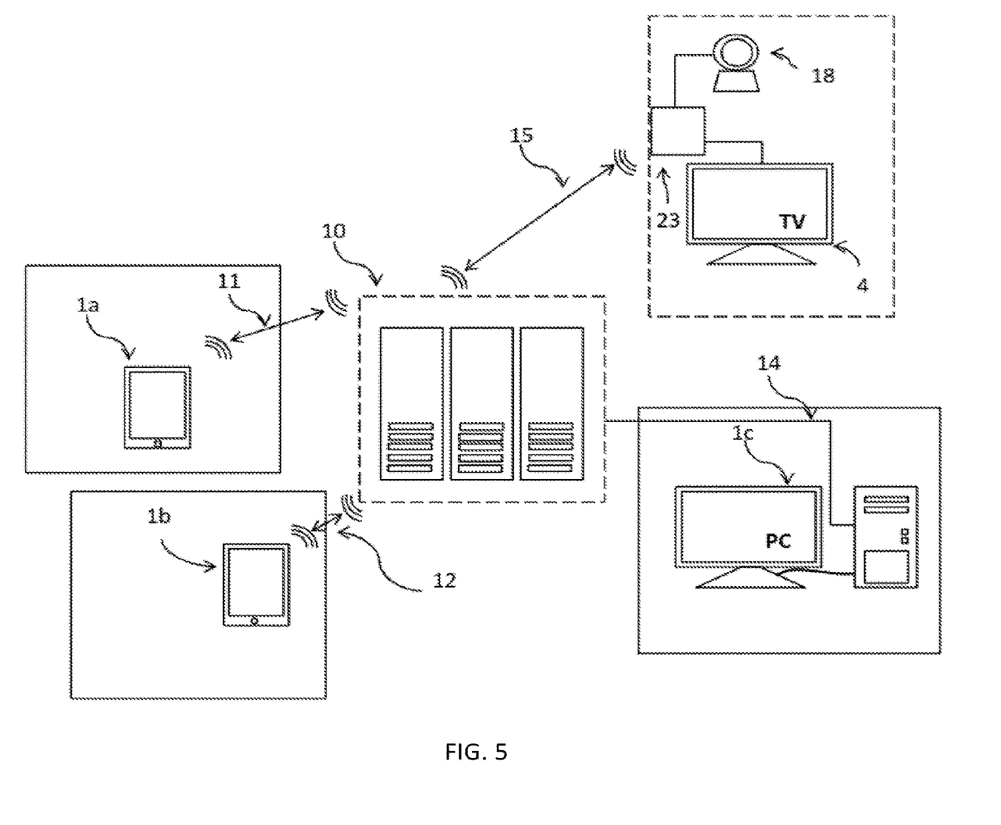
FIG. 5 schematically illustrates the system for wireless presentation according to a variation of the embodiment of FIG. 3.

According to a further embodiment shown in FIG. 5, which represents a variation of the embodiment in FIG. 3, the first processing apparatus 2 and the second processing apparatus 3 can be comprised in a same third processing apparatus 23, or they can be the same processing apparatus 23. The same processing apparatus could be, according to some embodiments, a same data processing unit, for example a same computer or a same PC.

According to further embodiments, the system for wireless presentation could be implemented in the form of a collection of software modules including (i) a plurality of user terminal software modules installable on respective user terminals, 1a-1d, (ii) a server software module installable on a server 10, (iii) at least one software module for a first processing apparatus associable to a display unit 4 installable on a first processing apparatus which is associable to a display unit 4 and can be configured to establish a connection to the server software module.

In such a case the various software modules are configured to enable the respective hardware components on which they are installed to perform the same functions as described previously. The collection of software modules can also comprise further software modules, for example, a software module for a second processing apparatus 3 associable to a camera 18 or a software module for the third processing apparatus 23 associable to the display unit and the camera.

In one embodiment, the software module for the user terminals 1a-1d is configured to enable both (i) the function of presenter user terminal and (ii) the function of receiving terminal in a given session, i.e. the function of displaying the image content via the respective user display on the basis of the image signal transmitted by the presenter user terminal. The software module for the first processing apparatus 2 and the third processing apparatus 23, by contrast, is configured to enable the function of receiving terminal in a given session, but not to enable the function of presenter user terminal in a given session.

Furthermore, said software modules can be stored in a respective collection of computer-readable data carriers.

Figure 6:
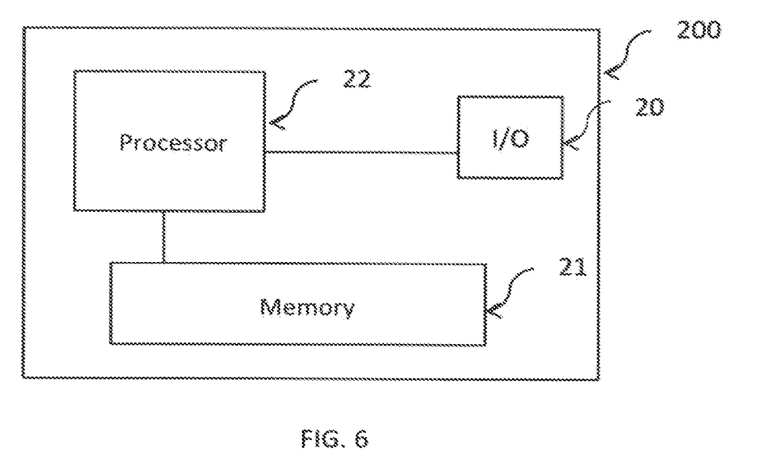
FIG. 6 illustrates a representation, given by way of example, of a hardware structure of a user terminal and/or processing apparatus and/or server.

FIG. 6 shows a representation, given by way of example, of a hardware structure 200, which can be used to implement one or more of the above-described devices (first processing apparatus 2, second processing apparatus 3, server 10 and/or user terminals 1a-1d).

The hardware structure 200 can include one or more processors 22 and one or more memories 21 (or storage media). The processor 22 can control the writing and the reading of data from the memory 21 in every suitable manner. The processor 22 could for example perform the function of creating the above-described signals or processing said signals. In particular, the processor could perform all of the functions described above with reference to the first processing apparatus 2, the second processing apparatus 3, the third processing apparatus 23, the server 10, or the user terminals 1a-1d.

The hardware structure 200 includes an input/output module 20 intended to receive signals and/or transmit signals.

According to preferred embodiments, and as will be apparent to the person skilled in the art, the various above-described functions of the first processing apparatus 2, the second processing apparatus 3, the server 10, or the user terminals 1a-1d can be performed by one or more distributed systems comprising various apparatus, rather than by a non-distributed physical entity.

According to preferred embodiments, the display unit 4 could be such as to make the displayed content easily viewable by a number of users, and have, for example, a minimum size. The minimum size could be greater than or equal to 50 inches.

According to yet other preferred embodiments, the server 10 could be configured to transmit the camera signal received from the second processing apparatus 3 (or from the processing apparatus 23) exclusively to the presenter user terminal in a given session. In the event that the presenter user terminal is running a video conferencing software program in order to conduct a video conference with a remote station (for example Skype), the camera signal received by the server could be sent to the remote station, whilst the camera signal received by the remote station via the video conferencing software could be shared with all the user terminals 1a-1d and the processing apparatus 2 and 23 in the given session.

What is claimed is:

1. A system, comprising:
a server configured for a plurality of virtual rooms and a plurality of temporary sessions, each temporary session corresponding to one of the plurality of virtual rooms;
a plurality of user terminals connected to the server, wherein each user terminal includes a user display;
at least one first processing apparatus associated to a display unit and configured to establish a connection to the server;
wherein the system is configured, when a first user terminal selects a virtual room, to create the temporary session and to allow the first user terminal and the plurality of user terminals to access the temporary session;
wherein the at least one first processing apparatus is associated to a predetermined virtual room and is configured to access the temporary session;
wherein, in each temporary session, one user terminal is configured to transmit an image signal to the plurality of user terminals and to the first processing apparatus; and
wherein all the plurality of user terminals are configured to display the image signal via the display unit.

2. The system of claim 1,
wherein the number of configured virtual rooms is larger than the number of the at least one processing apparatus.

3. The system of claim 1,
wherein the server is adapted to preconfigure the plurality of virtual rooms, each virtual room being selectable by at least one user terminal.

4. The system of claim 1,
comprising a plurality of processing apparatuses, wherein each processing apparatus is connectable to a respective display unit.

5. The system of claim 4,
wherein each one of the plurality of processing apparatuses is associated to a predetermined virtual room out of the plurality of virtual rooms and is configured to access the temporary session corresponding to the respective associated virtual room, each processing apparatus being associated to a different virtual room compared to the other processing apparatuses.

6. The system of claim 5,
wherein the first processing apparatus associated to the predetermined virtual room is configured to automatically access a temporary session corresponding to the predetermined virtual room, when the temporary session corresponding to the predetermined virtual room is created.

7. The system of claim 1,
wherein at least one user terminal of the plurality of user terminals is configured to access the temporary session based on session information.

8. The system of claim 7,
wherein the session information is input information inputted by a user of the at least one user terminal.

9. The system of claim 8,
wherein the user of the at least one user terminal can trigger the at least one user terminal to automatically detect the session information.

10. The system of claim 1,
wherein, in each temporary session, at least two user terminals which have accessed a same temporary session are configured to transmit a respective image signal.

11. The system of claim 1,
wherein the at least one first processing apparatus is configured to cause the respective display unit to display a second image content on the basis of a patchwork signal generated on the basis of image signals from the at least two user terminals.

12. The system of claim 11,
wherein the patchwork signal represents a patchwork image, including the contents relative to the image signals.

13. The system of claim 1,
wherein the image signal transmitted by the user terminal is indicative of a content displayable by the user display of the user terminal.

14. The system of claim 1,
wherein the user terminal transmitting the image signal is configured to prevent other user terminals which have accessed the same temporary session from transmitting image signals.

15. The system of claim 1,
further including at least one second processing apparatus connectable to a camera, the second processing apparatus configured to receive from the camera an input camera signal and transmit an output camera signal to the server on the basis of the input camera signal.

16. The system of claim 15,
wherein the at least one second processing apparatus is associated to the same virtual room as the at least one first processing apparatus and is configured to access the temporary session corresponding to the virtual room.

17. The system of claim 16,
wherein the user terminals which have accessed the same temporary session as the second processing apparatus are configured to receive the output camera signal from the second processing apparatus.

18. The system of claim 1,
wherein at least one user terminal of the plurality of user terminals is configurable to establish a wireless connection with the server.

19. The system of claim 1,
wherein at least one first processing apparatus of the plurality of processing apparatuses is configurable to establish a wireless connection with the server.

20. The system of claim 1,
wherein at least one user terminal of the plurality of user terminals and at least one first processing apparatus of the plurality of processing apparatuses are configurable to establish a wireless connection with the server.

* * * * *